United States Patent [19]

Marziale et al.

[11] Patent Number: 5,101,774
[45] Date of Patent: Apr. 7, 1992

[54] ACOUSTIC LEAK DETECTION SYSTEM

[75] Inventors: Michael L. Marziale, Covington, Va.; Stephen J. Paradis, Stanford, Calif.

[73] Assignee: Westvaco Corporation, New York, N.Y.

[21] Appl. No.: 520,978

[22] Filed: May 4, 1990

Related U.S. Application Data

[63] Continuation-in-part of Ser. No. 389,727, Aug. 3, 1989, Pat. No. 4,960,079.

[51] Int. Cl.$^5$ .............................................. F22B 37/42
[52] U.S. Cl. .................................. 122/504.2; 165/11.1; 73/40.5 A
[58] Field of Search ................ 73/40.5 A; 340/605; 122/504.2; 165/11.1

[56] References Cited

U.S. PATENT DOCUMENTS

| | | | |
|---|---|---|---|
| 3,403,642 | 10/1968 | Parkin | 110/7 |
| 3,615,175 | 10/1971 | Nelson . | |
| 3,831,561 | 8/1971 | Yamamoto et al. | 122/379 |
| 4,287,581 | 9/1981 | Neale, Sr. | 73/40.5 A X |
| 4,327,576 | 5/1982 | Dickey et al. | 73/40.5 A |
| 4,425,798 | 1/1984 | Nagai et al. | 73/659 |
| 4,462,319 | 7/1984 | Larsen | 110/238 |
| 4,498,333 | 2/1985 | Parthasarathy | 73/40.5 A |
| 4,502,322 | 3/1985 | Tero | 73/40.5 A |
| 4,543,817 | 10/1985 | Sugiyama | 73/40.5 A |
| 4,570,489 | 2/1986 | Baumaire et al. | 73/658 |
| 4,635,042 | 1/1987 | Andrews | 340/605 |
| 4,640,121 | 2/1987 | Keuker et al. | 73/40.5 A |

Primary Examiner—William E. Wayner
Attorney, Agent, or Firm—W. A. Marcontell; R. L. Schmalz

[57] ABSTRACT

Paper pulp mill chemical recovery boiler steam piping is monitored for leaks by an acoustic leak detection system responsive to atmospherically carried sound transmissions. Energy level amplitudes of respective analog electrical signals generated sequence multiplicity of microphones are converted in a rapid time sequence to a first electric pulse signal sequence representative of corresponding digital values. Such digital values are temporarily stored in a data memory bank to be subsequently processed by a Fast-Fourier Transform spectral analysis into a second electrical pulse signal sequence representative of corresponding digital values in the amplitude vs. frequency domain. Such amplitude vs. frequency signal values respective to each microphone are further refined for comparison to historical threshold data for a probability determination of a leak status.

18 Claims, 7 Drawing Sheets

ACOUSTIC LEAK DETECTION SYSTEM

This application is a continuation-in-part of Ser. No. 07/389,727, filed Aug. 3, 1989, now U.S. Pat. No. 4,960,079.

BACKGROUND OF THE INVENTION

1. Field of the Invention

The present invention generally relates to steam boiler furnaces and more specifically, to acoustic methods and apparatus for determining the existence of a fluid leak from pressurized tubing suspended within a furnace combustion space.

2. Description of the Prior Art

Pursuant to present-day paper pulp mill operations, raw wood is delignified by a thermo-chemical process comprising an approximately 350° F. cook in the presence of sodium hydroxide, sodium carbonate, sodium sulfide and other sodium based compounds. Under such conditions, the lignin binder in the raw wood matrix which holds the natural cellulose fibers together reacts with the sodium compounds to form water soluble lignin-sodium complexes thereby permitting a water wash separation of the black, tar-like lignin from the fiber for manufacture of paper.

Although the sodium compounds used in the aforedescribed process are relatively inexpensive, the quantities consumed in the production of an average pulp mill necessitate an economical recovery and re-cycle of the chemical values. Moreover, such sodium-lignin complexes contain sufficient heat value and volatility to contribute favorably to the overall mill heat balance. These characteristics are combined in the liquor recovery furnace by fueling a boiler furnace with a concentrated flow stream of the spent or black pulping liquor. Combustion of the lignin fraction generates sufficient heat to evaporate the residual water vehicle and heat the steam required for the primary evaporative liquor concentration process. Residual ash, predominately sodium carbonate, falls to the furnace bed as a viscous smelt. Such smelt is cooled and dissolved in water to form the green liquor makeup stream from which the other fresh cooking liquor compounds are made.

Economics and thermal efficiency highly favor the use of such recovery furnaces but the practical, daily operation is potentially hazardous due to the risk of steam or water leaks from the heat transfer conduits therein. When the fluidized smelt in the recovery furnace bed is contaminated with water, a reaction of an explosive nature has been known to occur. Reference is given to U.S. Pat. Nos. 3,831,561 issued to T. Yamamoto et al. 3,615,175 issued to H. W. Nelson and 3,403,642 issued to A. Parkin for the scope of theory seeking to explain the mechanics of such explosive reactions. Regardless of the theoretical explanation, the physical fact remains that water contamination of a hot, recovery furnace smelt bed may destroy the furnace by a sudden pressure wave within the furnace combustion chamber. The most probable source of such water is from the boiler tubes, themselves. Over time and operation, the tubes develop leaks and water escaping from such leaks has no alternative but to fall into the smelt bed.

Traditional fuel (gas, oil and coal) fired steam generation furnaces have similar tubing leak problems but without the dire consequence of a smelt bed explosion. To detect the existence of such leaks in traditional fuel fired furnaces, acoustically sensitive systems have been developed to monitor combustion chamber sound emissions. These systems are designed to measure the magnitude of sonic energy from the combustion chamber atmosphere over a narrow frequency spectrum distinctive to fluid leaks from conduits. This is normally accomplished by means of a bandpass filter in the analog signal circuit of a sensitive microphone. Only leak distinctive frequencies are thereafter analyzed.

Unfortunately, the normal operating background noise of a furnace combustion chamber produces the same distinctive frequencies in considerable magnitude. It is the task of the acoustic leak detecting monitor, therefore, to distinguish a small, incremental increase in sonic energy due to a tubing leak from the large background energy normally present.

In the case of traditional fuel fired furnaces, this electronic signal discriminating task is aided by the fact that combustion is sustained by a relatively steady flow of clean fuel. Solid combustion products (soot) are relatively small and the percentage of furnace operating time devoted to soot blower operation is relatively small.

Soot blowers are steam jets directed upon the external surfaces of the boiler tubing for the purpose of periodically dislodging accumulated soot particles and maintaining a high heat transfer rate through the tubing. In effect, therefore, soot blowers are deliberately and strategically applied steam leaks within the combustion chamber having a necessary maintenance purpose. When the soot blower operating cycle begins, signal reception from acoustic leak detectors must be either terminated or ignored for the purpose of tubing leak analysis. Since the soot blower operating cycle is relatively short and infrequent in traditional fuel fired furnaces, the signal interruption is of little consequence to an electronic monitoring apparatus reliant upon a continuous, steady-state signal to distinguish small percentage variations from a normal threshold magnitude.

In this respect, chemical recovery furnaces differ significantly from traditional fuel first furnaces. The chemical recovery furnace fuel is "dirty" and of irregular volatility and fuel value. Soot production is enormous. Consequently, recovery boiler tube soot blowers must be used more frequently for longer operating intervals. Little time remains between soot blower operating cycles to accumulate and evaluate "normal" combustion chamber acoustics.

It is, therefor, an object of the present invention to provide an acoustic leak monitor for chemical recovery furnaces and other steam generating furnaces capable of reliably analyzing an extremely short duration acoustic source.

Another object of the present invention is to provide a method and apparatus to digitally characterize an analog acoustic signal for immediate storage and subsequent retrieval and analysis.

Another object of the present invention is to provide an acoustic leak detection method and apparatus which converts microphone analog signals from an amplitude vs. time domain, as received, to a pulsed signal sequence representative of corresponding digital values in the amplitude vs. frequency domain for comparative analysis.

SUMMARY OF THE INVENTION

These and other objects of the invention are accomplished by means of an acoustic monitor having a multiplicity of pressure transducing sensors or microphones distributed about the perimeter of a boiler. Such microphones are piezoelectric devices that originate an electric voltage in response to the physical stress of a pressure wave. Boiler wall penetrating waveguides for each microphone are strategically oriented to emphasize the acoustic emissions from select areas of tube bundles. Analog electric voltage signals from each microphone are initially amplified for transmission to a multiplex switching module which passes each signal on, sequentially, to an analog frequency filtering circuit prior to an analog-to-digital (A/D) converter. The converter assigns a digital value to the signal voltage amplitude at each instant of a rapid sequence of time intervals and transmits an electric pulse sequence representative of each digital value. The digital amplitude vs. time pulse signal flow from the A/D converter is temporarily recorded in an appropriate computer memory from which it is drawn for subsequent processing.

Such amplitude vs. time digital pulse signals respective to each microphone are subsequently processed using a Fast-Fourier Transform Spectral analysis into a pulsed digital signal sequence representing corresponding values in the amplitude vs. frequency domain for random access memory storage. In this form, the pulsed signal sequence is accessed for more detailed scrutiny and comparison.

The full frequency spectrum subject to detailed scrutiny is divided between frequency limits into several segments and integrated with respect to frequency. The integral conclusion of each segment is then weighted by an experimentally determined bias factor to emphasize the significance of selected frequency segments over the others. The integrated, biased result of all segments in a signal flow interval is then summed and the summation value compared to several operating experience concluded threshold values to annunciate status quality conclusions respective to (a) normal operation, (b) equipment failure, (c) possible leak, (d) probable leak and, (e) alarm.

BRIEF DESCRIPTION OF THE DRAWINGS

Relative to the drawings wherein like reference characters designate like or similar elements throughout the several figures of the drawings.

DESCRIPTION OF THE PREFERRED EMBODIMENT

Figure 1:
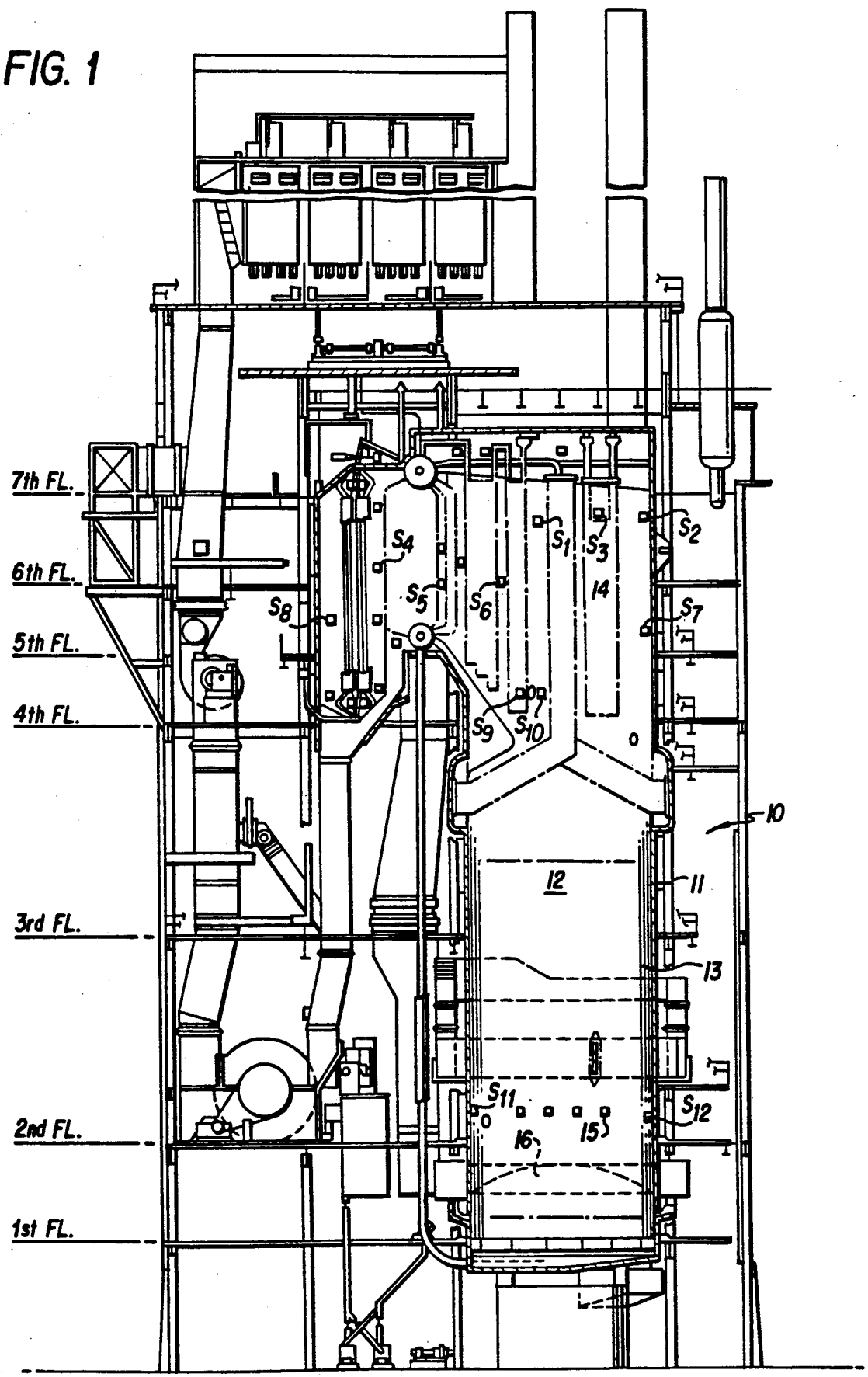
FIG. 1 is a schematic elevation of a typical chemical recovery boiler.

The sectional elevation of FIG. 1 shows the boiler tube pattern and layout for a typical chemical recovery furnace 10 having perimeter walls 11 surrounding a combustion space 12. Lining the perimeter wall interior are preheating tubes 13 which carry water to supply the boiler tubes 14. A multiplicity of apertures 15 around the furnace perimeter wall receive fuel guns, whether oil or pulping liquor, for supporting a continuous combustion within the space 12. At the furnace base, a viscous bed 16 of smelt is accumulated from the liquor ash and chemical solids.

For the invention embodiment described herein, twelve acoustic sensors, labeled $S_1$ through $S_{12}$, are positioned around the boiler perimeter at strategic locations conveniently identified by the most proximate structural floor level.

Figure 2:
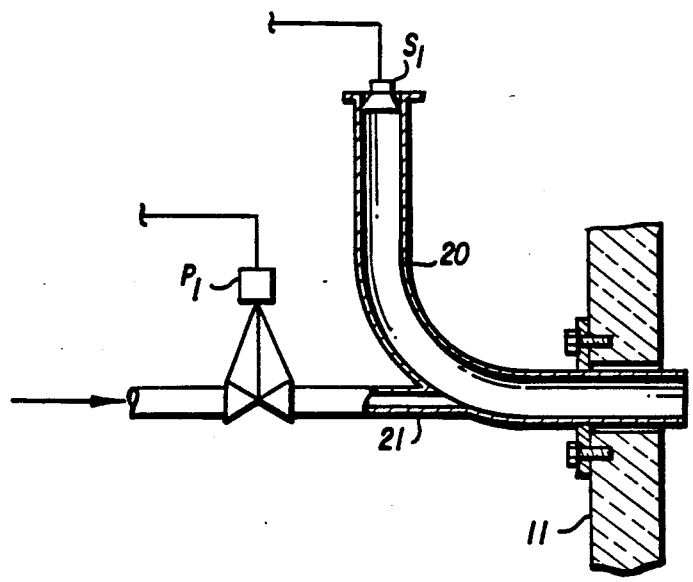
FIG. 2 is a partial section of an acoustic waveguide unit.

Basic sensor construction is illustrated by FIG. 2 which includes a wave guide 20, a purge line 21, a remotely operated steam or air valve $P_1$ and a microphone $S_1$. The waveguide 20 has the appearance of a long radius, thin wall, 1½ inch steel tubing ell having polished internal bore surfaces. The purge line 21, which junctures with the wave guide 20 along a tangent axis, includes the remotely operated valve $P_1$ to control the flow of steam or pressurized air into the combustion chamber leg of the waveguide bore for soot cleaning. The microphone $S_1$ is mounted within the waveguide bore at the terminus of the remote or distal leg thereof.

Figure 3:
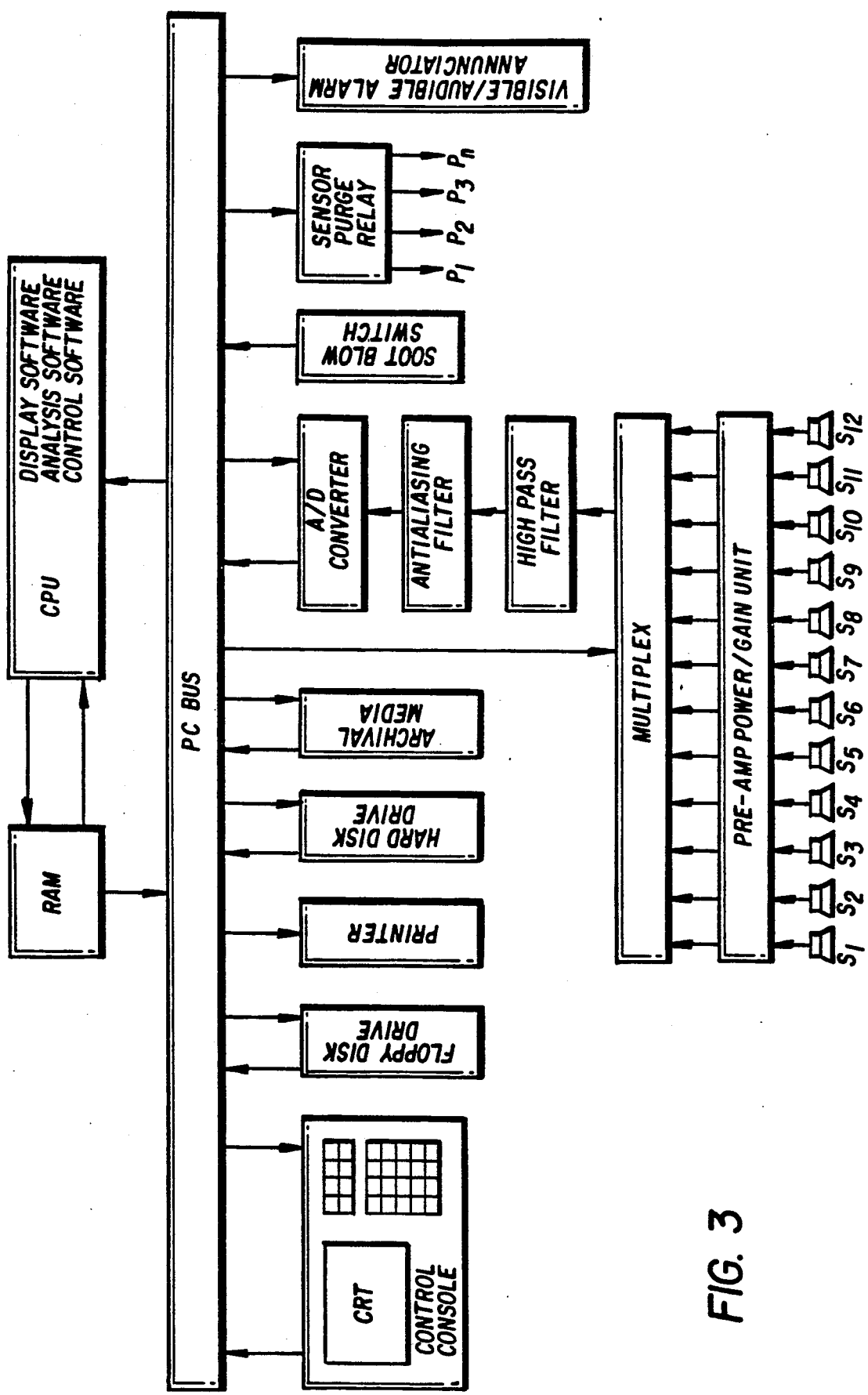
FIG. 3 is a component schematic of the present invention.
Figure 4:
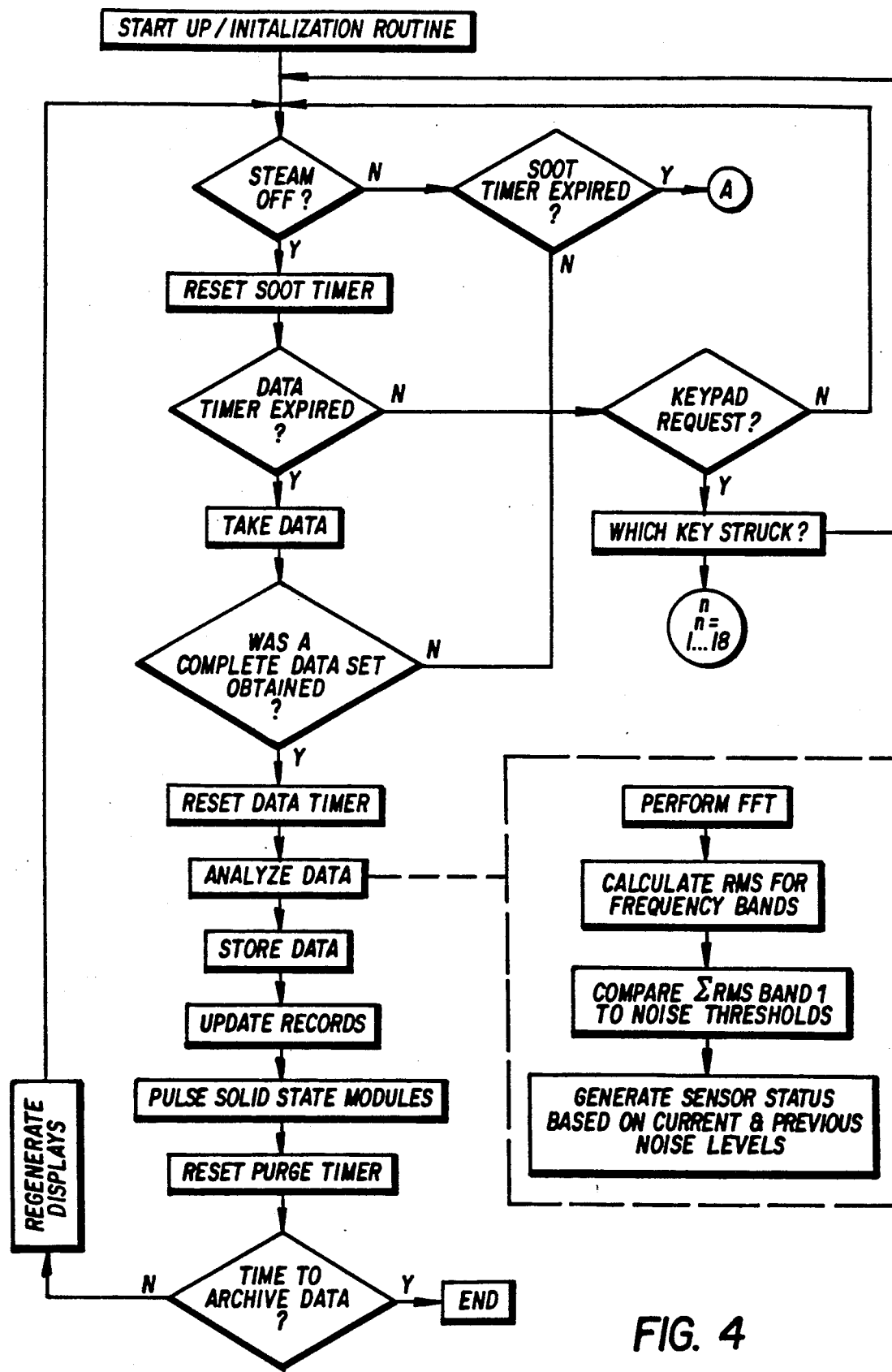
FIG. 4 is a logic flow chart for invention control and analysis software.
Figure 5:
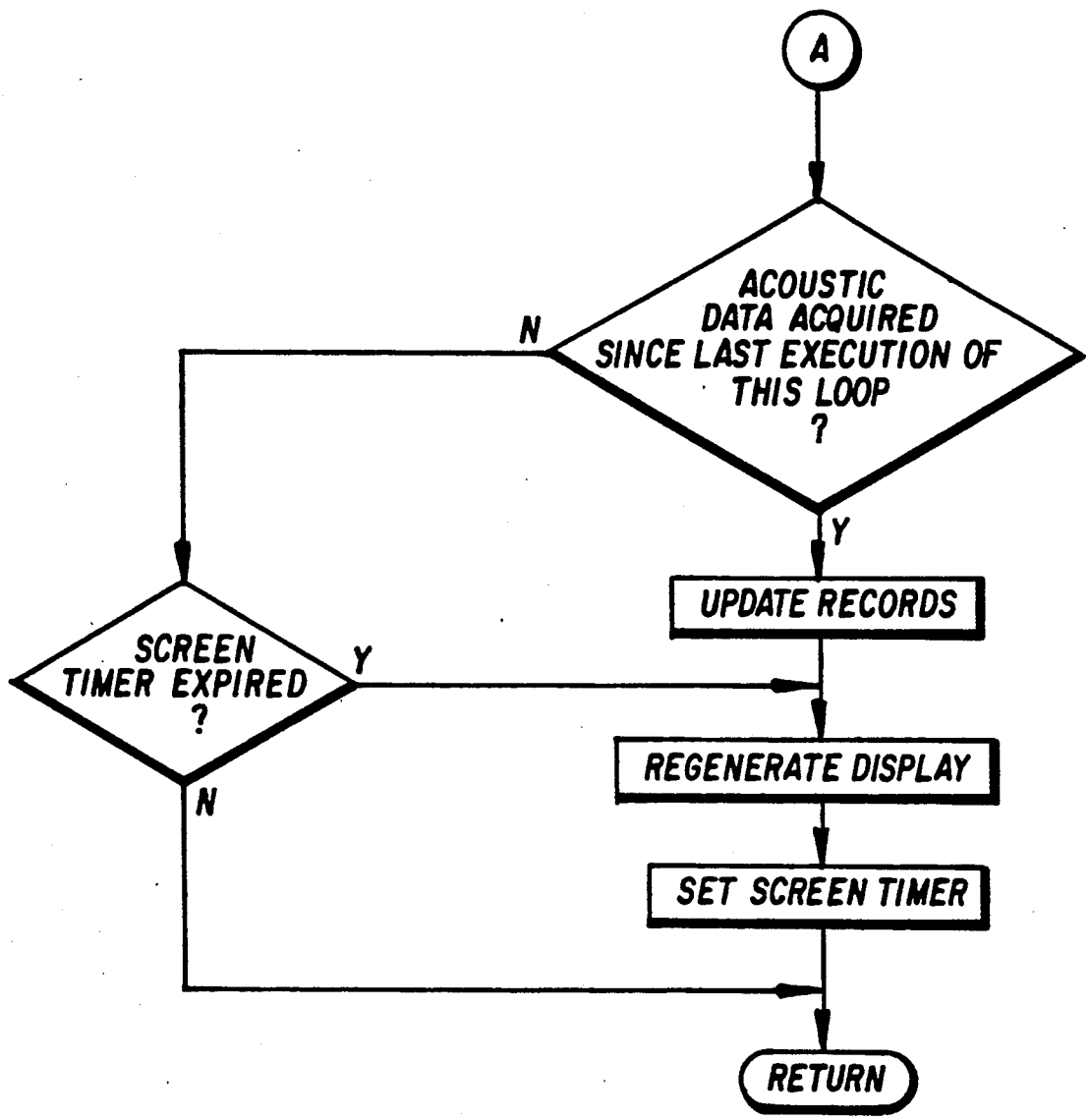
FIG. 5 is a subroutine control chart for soot blower timing.

Relative to the signal schematic or FIG. 3, and the control logic flow charts of FIGS. 4 and 5, analog signals respective to each of the microphones $S_1$, $S_2$ etc. are separately amplified and passed on individually to a sequential multiplex switching unit. Functionally, a multiplex is similar to a rotary switch wherein a plurality of signal leads stand available for selective, isolated connection to a singular terminal. Upon Signal command from the central computer processing unit, as determined by process control software, a control signal from the computer (PC) bus selected a specific microphone signal for analog filtering and analog-to-digital conversion. For example, soot blowers may be programmed to operate 7 minutes out of a 7.5 minute cycle thereby leaving the boiler quiet of acoustic emissions from soot blower sources for 0.5 minutes in a cyclic interval of 7.5 minutes. This is the time allotted for acoustic sampling from all 12 of the microphones, i.e. 2.5 seconds of data from each microphone in a 7.5 minute cycle if distributed equally per microphone. A capacity to alter the sampling time distribution per microphone or to completely omit sampling from one or more such microphones is one of the advantages of a computer controlled multiplex. Another such advantage is the capacity and ease of changing the sampling sequence.

To protect the system from taking acoustic data during soot blower operating periods, signal control software in the Central Processing Unit (CPU) receives a signal from a soot blower switch when the soot blowers are not operating. This soot blower switch is activated by soot blower steam flow so that when steam is flowing into the soot blower distribution system, no signal is relayed to the CPU.

Coupled with the soot blower switch is a software subroutine, schematically represented by FIG. 5, which refers to the time lapse since the previous data recording period. When that time lapse is greater than 7 minutes, for example, and the soot blower switch reports an interruption in the soot blower steam supply, conditions within the boiler are acceptable for acoustic data taking. The CPU control program will then connect the multiplex output circuit to the analog signal filtering and digital converting circuit.

If the subroutine determines that less than 7 minutes have elapsed since the previous data recording period, no data will be recorded notwithstanding termination of soot blower steam flow.

Microphone signals, as transmitted by the multiplex, are analog in nature and represent a composite of all frequencies in the broad spectrum of 50 Hz to 50,000 Hz. At any given instant, the signal strength or amplitude is the sum of the energy received from all frequencies. With reference to the graph of FIG. 6, this would be the integral under curve A.

Tests have shown that pressurized fluid, liquid and vapor, escaping from a carrier conduit emits an acoustic report between 50 and 20,000 Hz. However, the unattenuated portion of this spectrum distinguishable over the combustion bed noise appears to bracket within the 500 to 7,000 Hz range. This characteristic is reflected in the dashed, secondary line B of FIG. 5. Accordingly, it is the acoustic energy shown by FIG. 6 within the bracket C as the area under line A or B, depending on the presence and contribution of a leak, that is to be monitored for leak identification.

Since acoustic energy of less than 500 Hz frequency emitted by the furnace is of no consequence to the objective of leak monitoring, these frequencies are eliminated from the microphone analog signal flow stream by an appropriate high pass frequency filter circuit as represented by FIG. 3.

The anti-aliasing filter in this example circuit predominantly addresses 12,500 Hz and greater harmonics of lower frequencies which may or may not be present in a given installation of the present invention. Examples of the invention have been operated for limited periods of time without the anti-aliasing filter circuit with no perceptible consequence. Nevertheless, the system is vulnerable to distortion from high frequency harmonics, if present. The frequency value of this anti-aliasing filter is determined by $\frac{1}{2}$ of the analog-to-digital converter rate. The spectrum of suitable sampling rates ranges from 20,000 samples/sec. and upward.

Following frequency filtering, the remaining amplified analog signal from a particular microphone, $S_1$, for example, is digitized by an analog-to-digital (A/D) converter. Functionally, the A/D converter assigns a digital value to the instantaneous amplitude of the analog signal flow at a series of brief, uniformly spaced instants. For example, a digital value is assigned to the analog signal amplitude at each of 0.04 millisecond (0.00004) second time intervals. Resultantly, the A/D converter emits a pulse sequence signal unique to each digital value. This digital data flow is temporarily stored in the appropriate memory bank for subsequent recall. Each set of microphone signal amplitude digital values is stored for coordinated retrieval with the instant, in series, at which the value occurred.

Having received, filtered, converted and stored the signal data respective to microphone $S_1$ for 0.1 to 0.4 seconds, for example, the multiplex terminates $S_1$ signals and connects signals from the $S_2$ microphone, for example, to the analog filter and A/D converting circuits. Although a 2.5 second, equally apportioned time window is available for transmitting signal data from each microphone channel, the resulting magnitude of data from the 2.5 second interval is normally excessive for the functional objective. Moreover, recordation of such digital data as pulsed sequence signals would be excessive and require an unreasonably large memory capacity Consequently, a 0.1 to 0.4 second data sampling window respective to each microphone has been found sufficient.

This pulsed signal collection sequence continues until the desired amount of signal data from each microphone in the system has been recorded whereupon the FIG. 4 charted CPU control program starts to process the recorded data with a Fast Fourier Transform (FFT) algorithm to convert the data from an amplitude vs. time domain to an amplitude vs. frequency domain. As developed by Peter Bloomfield, "Fourier Analysis Of Time Series: An Introduction," John Wiley & Sons, Inc., 1976, such an algorithm is based upon the mathematical premise that any well-behaved function f(t) can be expressed within a given interval of 2L as a sum of sine and cosine functions.

To wit:

for: $-L < t < L$ $$f(t) = A_o + \sum_{n=1}^{\infty} \left( A_n \cos \frac{\pi n t}{L} + B_n \sin \frac{\pi n t}{L} \right)$$

where:

$$A_o = \frac{1}{2L} \int_{-L}^{L} f(t) dt$$

$$A_n = \frac{1}{L} \int_{-L}^{L} f(t) \cos \frac{\pi n t}{L} dt$$

$$B_n = \frac{1}{L} \int_{-L}^{L} f(t) \sin \frac{\pi n t}{L} dt$$

The amplitude terms, $A_n$ and $B_n$, describe the contributions to the overall function at their respective frequencies.

A definition of "well-behaved" functions may be found in "CRC Standard Mathematical Tables," 15th ed., 1967, Editor: S. M. Selby, pg. 406, The Chemical Rubber Company, Cleveland, OH.

Figure 6:
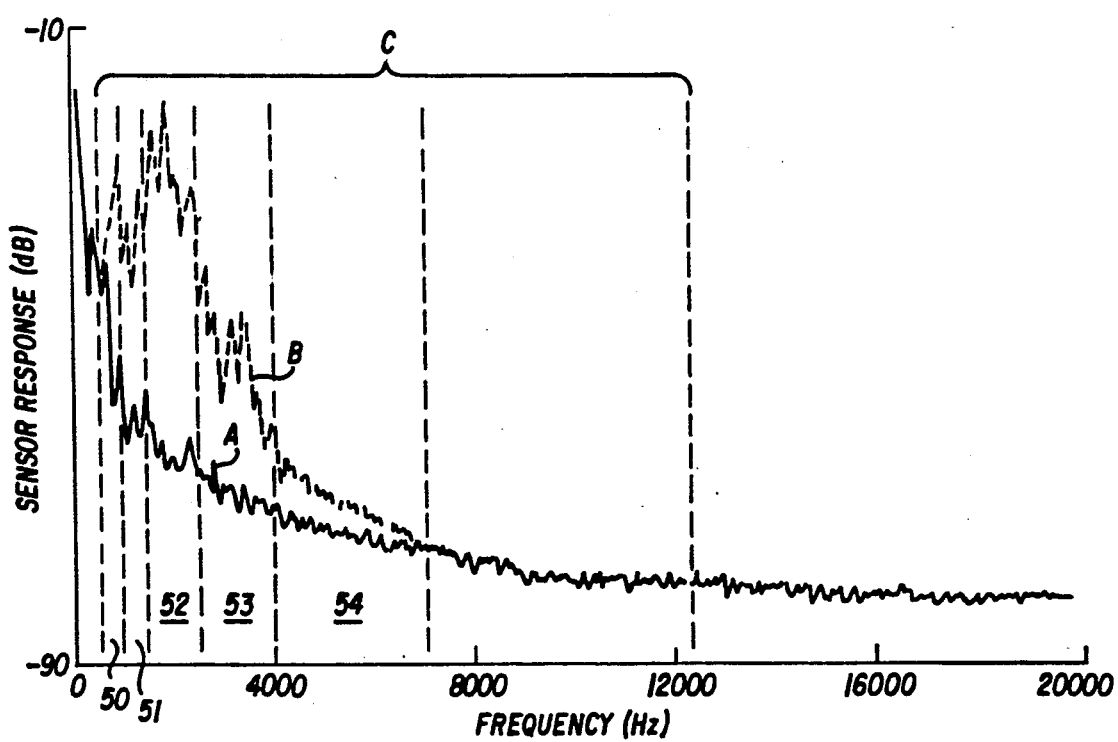
FIG. 6 is a graph of furnace acoustic energy distribution in the amplitude vs. frequency domain.

Shown within the bracket C portion of the FIG. 6 graph is an analog representation of FFT converted data from a single microphone channel.

Under normal furnace operating conditions, a graphic, analog representation of such digital data may appear as the solid line A of FIG. 6. In the presence of a leaking tube, however, such data may take the form of dashed line B. It is the comparative difference between lines A and B that distinguishes the existence of a tube leak.

To make the necessary comparison, a baseline or reference value is established for line A. This is done by segmenting the monitored frequency spectrum between 500 and 7,000 Hz into several units. Segment 50 ranges between 500 and 1,000 Hz; segment 51 spans 1,000 to 1,500 Ha; segment 52 spans 1,500 to 2,500 Hz; segment 53 spans 2,500 and 4,000 Hz; and segment 54 spans 4,000 to 7,000 Hz. Under known conditions of normalcy, the amplitude vs. frequency relationship is integrated between the respective frequency segment limits to conclude a digital, root mean square (RMS) value representative of normalcy for that frequency segment. The Five segment values are then added for a "normal" value. This "normal" value is memory stored for future reference as basis for a "primary threshold" value which may or may not, at the operator's discretion, be the same as the "normal" energy value expected from the respective microphone. This distinction between a "normal" value and a "primary threshold" value will be further developed later.

Although FIG. 6 displays these characteristics in analog form, it should be understood that in actual practice the comparison is made by automatic data processing equipment working with a digital data set. Physically, such digital data is transmitted and processed as pulsed electrical signals having respective pulse sequences which represent corresponding digital values.

Data developed from each microphone operating or measuring cycle is processed in the same manner to include (1) conversion of analog signal amplitude variations with time to digital amplitude values respective to time, (2) Fourier Transform of the digital amplitude vs. time data to digital amplitude vs. frequency, (3) segmental integration of the amplitude vs. frequency data, and (4) summation of the segment integration values.

For each microphone, the total segmental integration value is a digital data value that is memory stored for comparison to the primary threshold value P, (FIGS. 8, 9, and 10), an upper alarm threshold value U and an equipment failure threshold value L. The U and L thresholds are usually set manually by the operator on the basis of use and experience but may also be set as an arithmetic function of the primary threshold value P. On a measuring cycle of 7.5 minutes, there will be a digital data value representative of the total segmental integration value, i.e. acoustic energy.

value, received by each microphone at each successive 7.5 minute interval.

It is appropriate to again note that the 7.5 minute duty cycle of the present embodiment example is only representative and by no means intended to be a critical period. If desired, a 10 minute duty cycle may be used as well.

Each data value in this succession of acoustic energy data is compared to the primary threshold value P, the upper alarm threshold value U, and to the equipment failure threshold value L. Should a single measured energy value respective to a particular microphone exceed the upper alarm threshold value U, a leak of catastrophic proportions is presumed to have erupted and the analysis program immediately notifies the display and control programs with an appropriate annunciation signal. Responsively, the display program will show the alarm on each of the CRT microphone status columns of FIGS. 7, 8, 9 and 10 as an "alarm" display adjacent the corresponding microphone identity. This display may include color and flashing. Simultaneously, the "alarm" status is appropriately signaled on each of the other CRT displays for the operator's immediate attention. The control program responds to the analysis program alarm signal by switching on immediate attention gaining accessory alarms such as lights and horns.

Assume, however, that a particular measurement cycle value for a given microphone is less than the lower threshold limit L. In this case, the display program directs a CRT presentation of the status column to show a "fail" status for the respective microphone as illustrated for microphones 7 through 12 of FIGS. 8, 9 and 10. Normally, this case will arise when the corresponding microphone or its supporting circuitry has failed to transmit the expected analog signal.

Between the two aforedescribed extremes is the hypothetical sequence wherein a leak begins with an extremely small fluid release and correspondingly small acoustic report. Over time, fluid erosion increases the size of the leak aperture and the consequential acoustic report. However, certain anomalies in the combustion chamber other than a leak may also cause an excessive acoustic report. To distinguish between an actual leak and a sonic anomaly, the present invention probability analysis program assumes that innocent anomalies are of temporary duration and will cease within a brief period of time. An actual leak, on the other hand, will continue or increase its sonic emission over the same interval. When emitting a sonic energy level less than the upper threshold value U, such a leak will not release a sufficient quantity of water within a half-hour, for example, to jeopardize the furnace safety. Consequently, the probability analysis program responds to the third continuous value report above the primary threshold value P by directing a "possible" leak display on the CRT status columns.

At the end of the next measuring cycle, 7.5 minutes for example, the status is upgraded to a "probable" leak condition if the primary threshold energy level P is still exceeded by the measured sonic energy value.

If by the end of the fifth measurement cycle, the same microphone is still reporting a measured energy value above the primary threshold P, it is assumed that the stimulus of this sonic energy is not an anomaly. At this point, the analysis program initiates a full "alarm" status to the system as would occur when the upper threshold limit U is exceeded by a single measurement.

Alternatively, if any measurement falls below the primary threshold value P, the analysis program includes a presumption that a previous abnormal value was stimulated by a combustion chamber or equipment anomaly and the status ramping program is reset. Nevertheless, the entire data sequence is memory stored for selected recall.

The frequency bands represented by segments 50, 51 and 52, 53 and 54 are also trimming planes whereby an operator may bias one or more particular frequency bands respective to any or all specific microphone channels for the purpose of accentuating or diminishing the influence of that frequency band on the total integration value. Consequently, the "normal" value for an integrated frequency segment may be amplified or suppressed and thereby amplifying or suppressing the total value of all segments in the monitored spectrum for comparison to the threshold value P. For example, if because of combustion or drafting patterns within a boiler, the acoustic energy received by the $S_6$ sensor is suppressed and weak within the frequency band 52 between 1500 and 2,500 Hz, the analysis program may be adjusted to amplify the integrated total of that frequency band prior to summation with the integrated totals of the other frequency bands for comparison to the threshold value P.

For the purpose of informing a human operator of furnace conditions, four video formats are suggested as shown by FIG. 7, 8, 9 and 10. In a vertical column along the left side of FIG. 7, the status category of all 12 microphones is shown simultaneously. The present invention has used five status categories: 1. normal operation signified by a dashed line; 2. equipment failure signified by "fail;" 3. a third sequential measurement in excess of a first threshold value P signified by "possible;" 4. a fourth sequential measurement in excess of the threshold value P signified by "probable;" and, 5. a fifth sequential measurement in excess of the threshold value P signified by "alarm."

Figure 7:
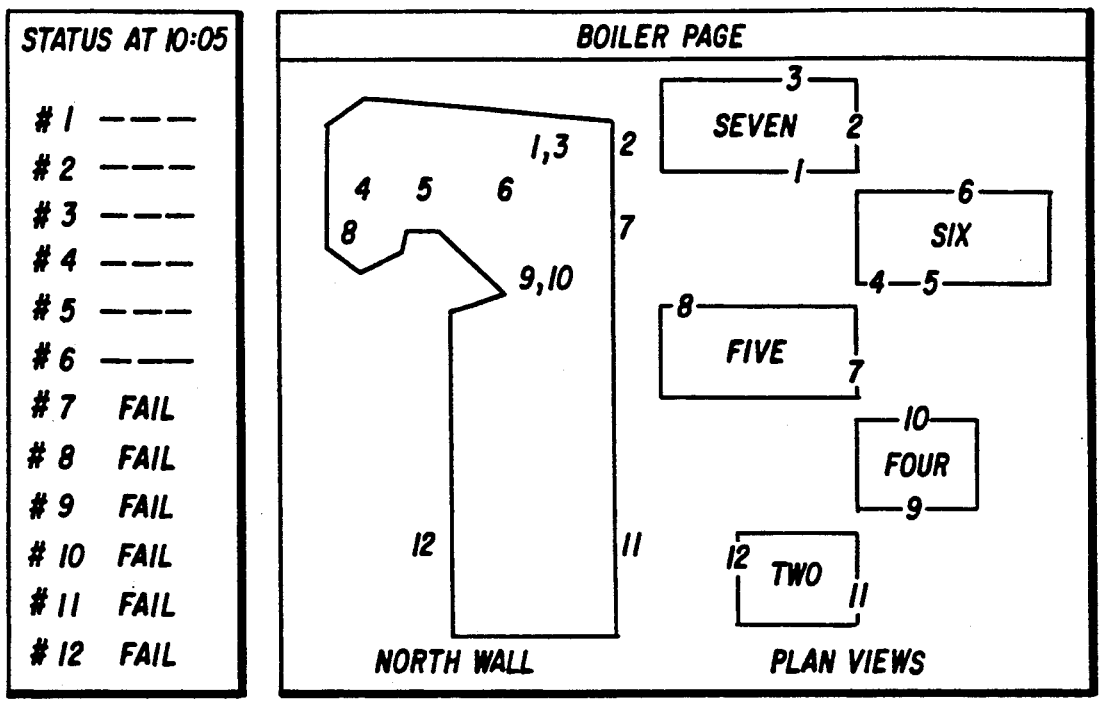
FIG. 7 is a representative first format video monitor display for the present invention.

The FIG. 7 status column shows microphones 1-6 as reporting normal operating conditions. However, microphones 7-12 are reporting equipment failure.

In the larger, right-hand area of FIG. 7, elevation and plan schematics of the furnace are shown to quickly remind the operator where a particular sensor may be physically located within the actual furnace chamber. In this view, the several status categories may be signified by displaying respective microphone identification numbers in colors distinctive to a corresponding status. Flashing may also be used.

The status column as described for FIG. 7 is repeated for the FIG. 6 display format. Additionally, FIG. 8 displays a graphic history of the $S_5$ microphone acoustic measurements over a preceding period of time. As shown, the selected preceding time period is thirteen days of a thirty day maximum. Selection is by operator discretion. The same information is stored for all microphones in the system, the particular microphone data shown being an operator choice. The graph illustrated is a series of data points respective to each sonic energy level measurement concluded by the probability analysis program for a particular microphone over the selected time period. If the measurement cycle is 7.5 minutes, there will be a data point for each 7.5 minute interval over the selected time period. The ordinate axis of the graph may be calibrated in force per unit area, decibels or in dimensionless percentages. The solid line P graphically displays the primary sonic threshold level for value comparison by the operator. Here also, colors may be used to emphasize the status category respective to the particular microphone under review.

Figure 8:
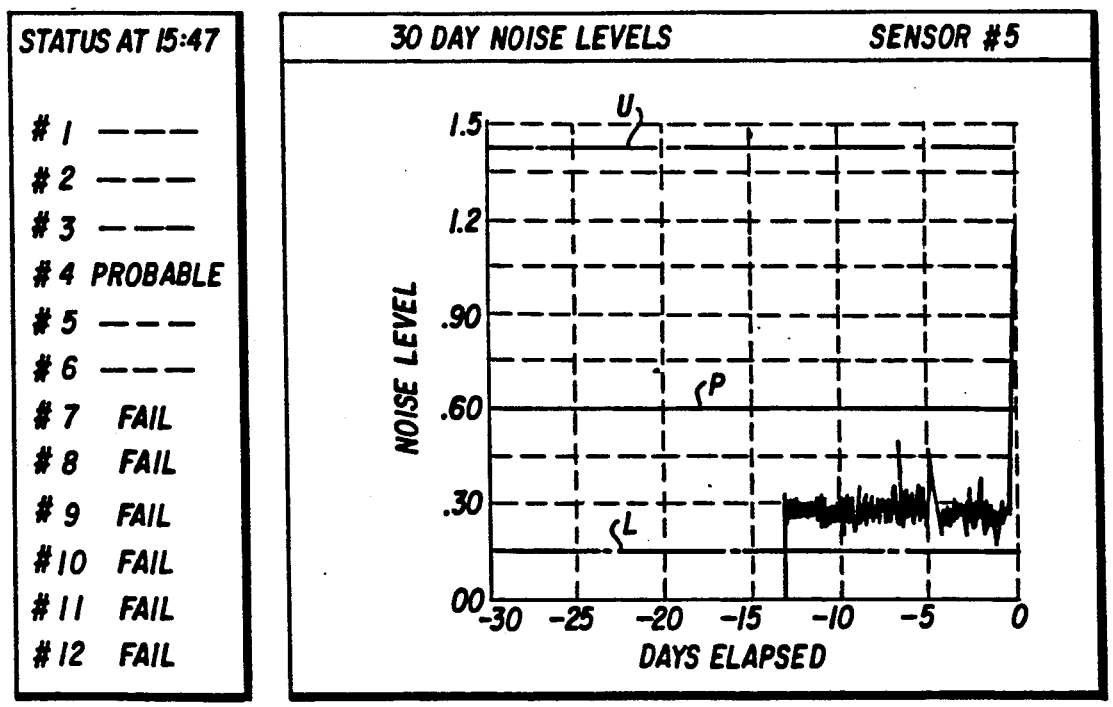
FIG. 8 is a representative second format video monitor display for the present invention.
Figure 9:
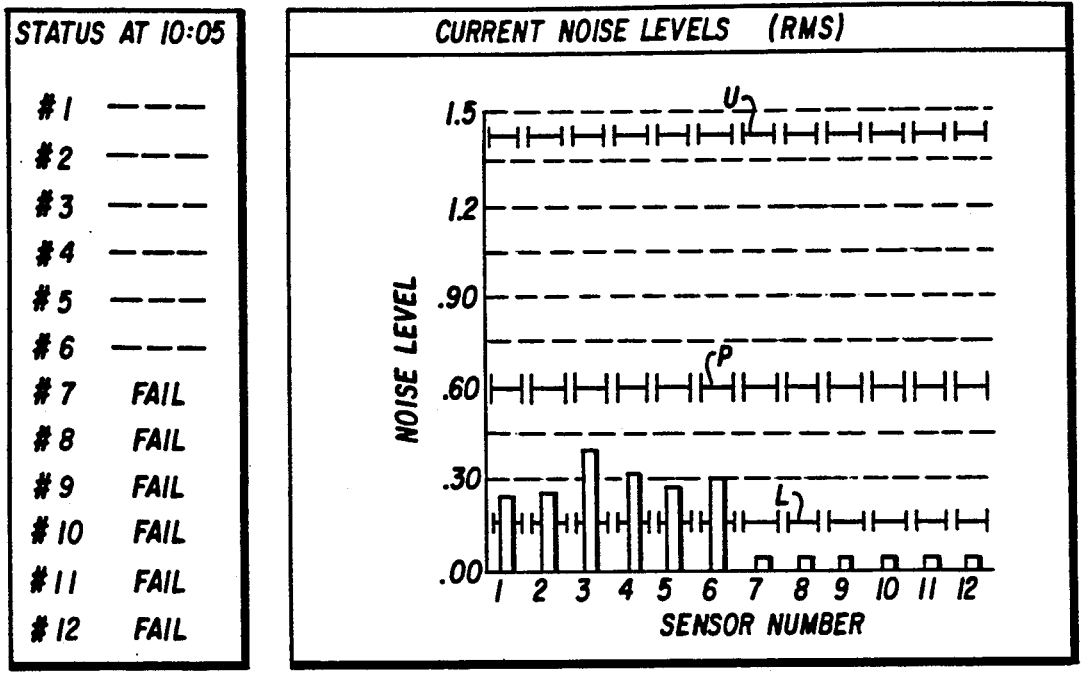
FIG. 9 is a representative third format video monitor display for the present invention.

FIG. 9 also displays a status column such as displayed by FIGS. 7 and 8. Additionally, FIG. 9 displays a comparative bar chart of the most recently measured data for all microphones in the system. As shown by FIG. 9, microphones $S_1$ through $S_6$ are reporting normal operations but microphones $S_7$ through $S_{12}$ report equipment failure. Status category colors respective to the several chart bars are particularly effective in this presentation.

Figure 10:
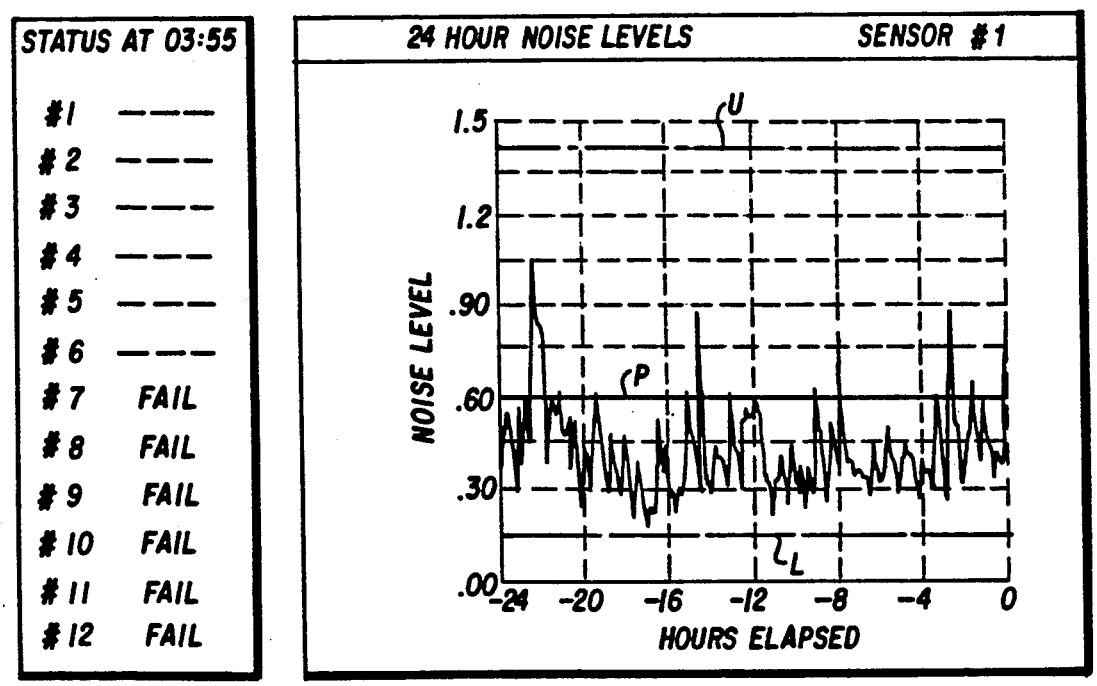
FIG. 10 is a representative fourth format video monitor display for the present invention.

The right hand graph of FIG. 10 displays the same data as FIG. 8 but over a full abscissa scale of 24 hours. Consequently, the lateral separation between each 7.5 minute data point interval is greater. This display is useful to reveal periodic anomalies in the system operation. Spikes shown above the alarm threshold P indicate the recurrence of a brief, intense sonic source heard by microphone $S_1$ at 6 to 7 hour intervals. However, such recurring sonic source is shown not to be critical as evidenced by the fact that the 7.5 minute report (data point) following the report of a threshold P exceeding sonic disturbance is a value less than the threshold P. An investigation of the anomalies may reveal an innocent reason for periodically excessive high sonic energy such as a single soot blower suffering periodic operating failure by not ceasing operation, a steam valve or a leaking steam flange outside of the boiler. Other samples of innocent noise are periodically large steam demands which can cause the tubing to hammer thereby resulting in the illustrated report pattern.

Having fully described our invention, modification and customization of the basic data control and analysis scheme to fit particular applications will readily occur to those of ordinary skill in the art. For example, analog signal filtering is merely an economic convenience and may be omitted by Fourier Transforming the entire signal transmission. Frequency discrimination would be the natural consequence of the bank integration process.

Another obvious modification would include a dedicated data processing unit for each sensor thereby omitting the need for the multiplexing unit. All sensor signals would be processed simultaneously.

As our invention, therefore,

We claim:

1. A boiler fluid tube leak detection process comprising the steps of:

generating a first continuum of analog electric signals in the amplitude vs. time domain responsive to acoustic emissions from a boiler combustion space having fluid heating tubes secured therewithin;

converting said first continuum analog signals at rapidly repeating time intervals to a first series of pulse signals representing a first digital data set in the amplitude vs. time domain;

processing said first series of pulsed signals from the amplitude vs. time domain to a second series of pulsed signals representing a second digital data set in the amplitude vs. frequency domain;

integrating at least a portion of said second series of pulsed signals between frequency limits to obtain a first value signal pulse representative of the acoustic energy emitted from said combustion space within said frequency limits;

comparing said first value signal pulse to a set-point value signal pulse and generating an annunciation signal corresponding to a quality of said first and set-point value signal pulse comparison representing the probability of a leak from said boiler fluid heating tubes.

2. A process as described by claim 1 wherein said processing step comprises a Fourier Transform algorithm for transforming said first series of pulsed signals representing a digital amplitude vs. time data set to said second series of pulsed signals representing a digital amplitude vs. frequency data set.

3. A process as described by claim 1 wherein said integrating step comprises the process of integrating said second series of pulsed signals between a plurality of finite frequency limits to derive a corresponding plurality of third signal pulses representing respective band values, said plurality of third signal pulses being summed to derive said first value signal pulse.

4. A process as described by claim 3 wherein designated band values are selectively weighted to bias the total of said first value signal pulse.

5. A process as described by claim 1 wherein said first value signal pulse is compared to a plurality of set-point value signal pulses.

6. A process as described by claim 5 wherein said plurality of set-point value signal pulses comprise a lower threshold value signal pulse, an upper threshold value signal pulse and an alarm value signal pulse.

7. A process as described by claim 6 wherein a first value signal pulse in excess of said alarm value signal pulse signifies a great probability of fluid escape from said fluid heating tubes.

8. A process as described by claim 6 wherein a first value less than said lower threshold value signifies an unreliability in said first continuum of analog signals.

9. A process as described by claim 6 wherein a first value signal pulse in excess of said upper threshold value signal pulse signifies a first probability of fluid escape from said fluid heating tubes.

10. A process as described by claim 9 wherein said process is repeated with a second continuum of analog electric signals in the amplitude vs. time domain generated from said boiler combustion space at a discontinuous time subsequent to said first continuum generation to successively obtain a second value signal pulse representative of the acoustic energy emitted from said combustion space at said subsequent time for comparison to said plurality of set-point value signal pulses.

11. A process as described by claim 10 wherein a second value signal pulse in excess of said upper threshold value signal pulse signifies a second probability of fluid escape from said fluid heating tubes greater than said first probability.

12. A process as described by claim 10 wherein a second value signal pulse which is less than said upper threshold value signal pulse cancels the first probability of fluid escape from said fluid heating tubes.

13. A process as described by claim 11 wherein said process is repeated with a third continuum of analog electric signals to successively obtain a third value signal pulse representative of the acoustic energy emitted from said boiler combustion space at a discontinuous time subsequent to said second continuum generation.

14. A process as described by claim 13 wherein a third value signal pulse in excess of said upper threshold value signal pulse signifies a third probability of fluid escape from said fluid heating tubes greater than said second probability.

15. A process as described by claim 13 wherein a third value signal pulse which is less than said upper threshold value signal pulse cancels said first and second probabilities of fluid escape from said fluid heating tubes.

16. A tube leak detection process for boilers having fluid heating tubes secured within a fuel combustion space, soot blowing means for periodically cleaning particulate combustion products from the external surfaces of said heating tubes and a multiplicity of acoustic sensing-means for generating a first continuum of analog electric signals in the amplitude vs. time domain responsive to acoustic emissions from said combustion space, said process comprising the steps of:

converting said first continuum analog signals at rapidly repeating time intervals to a first series of pulse signals representing a first digital data set in the amplitude vs. time domain during non-functioning periods of said soot blowing means;

processing said first series of pulsed signals from the amplitude vs. time domain to a second series of pulsed signals representing a second digital data set in the amplitude vs. frequency domain;

integrating at least a portion of said second series of pulsed signals between frequency limits to obtain a first value signal pulse representative of the acoustic energy emitted from said combustion space within said frequency limits;

comparing said first value signal pulse to a set-point value signal pulse; and, generating an annunciation signal corresponding to a quality of said first and set-point value signal pulse comparison representing the probability of a leak from said boiler fluid heating tubes.

17. A boiler tube leak detection system for boilers having fluid heating tubes secured within a fuel combustion space, soot blowing means for periodically cleaning particulate combustion products from the external surfaces of said heating tubes, and a multiplicity of acoustic sensing means for generating respective electric signals responsive to acoustic emissions from said combustion space, said leak detection system comprising signal processing means for evaluating from said electric signals a probability of fluid leakage from said heating tubes corresponding to one of at least three probability status categories, annunciation means responsive to said signal processing means for reporting said probability status category evaluation and soot blower switching means for interrupting the operation of said signal processing means during periods of soot blowing means operation.

18. A boiler tube leak detection system as described by claim 17 comprising multiplex switching means for sequentially connecting a singular acoustic sensing means signal with said signal processing means.

* * * * *